No. 879,668. PATENTED FEB. 18, 1908.
M. H. OLSON.
TRAP.
APPLICATION FILED SEPT. 16, 1907.
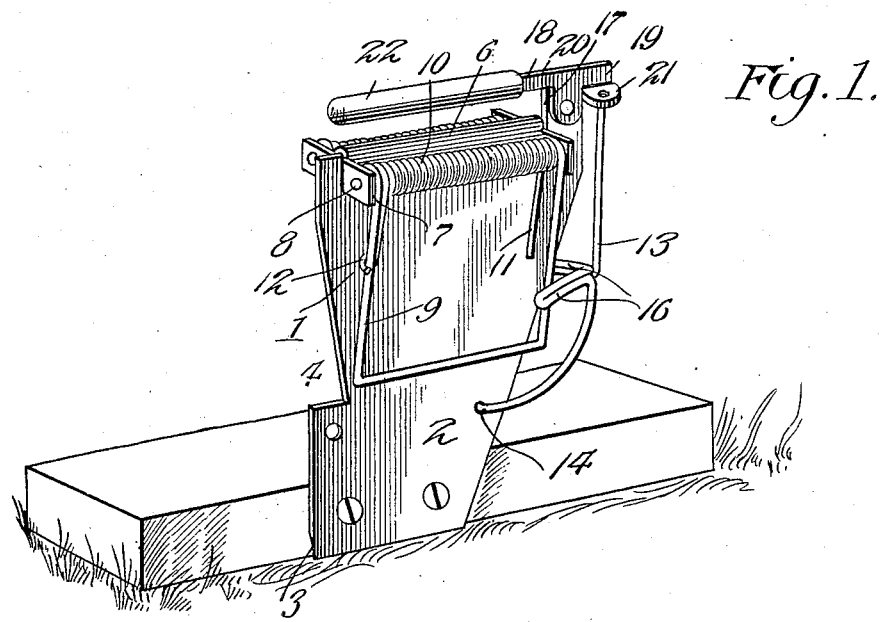
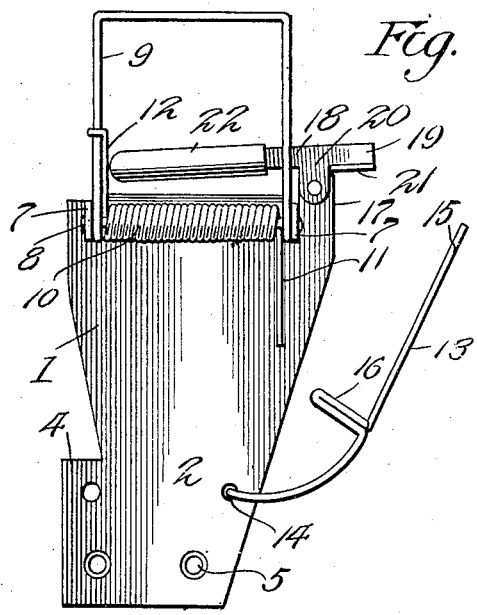
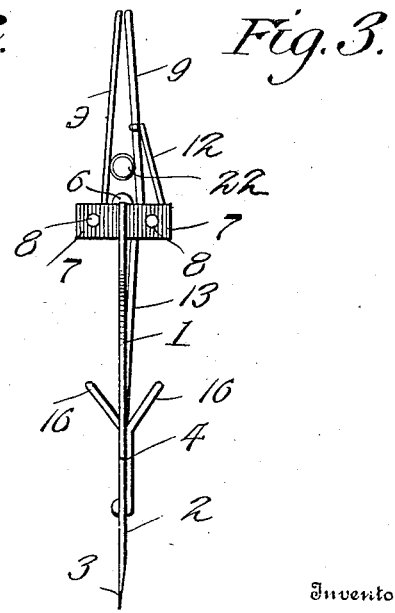
Witnesses
R. Hackman Jr.
C. C. Hines.
Inventor
Martin H. Olson
By Victor J. Evans
Attorney

UNITED STATES PATENT OFFICE.

MARTIN H. OLSON, OF LEER, MICHIGAN.

TRAP.

No. 879,668.　　　Specification of Letters Patent.　　　Patented Feb. 18, 1908.

Application filed September 16, 1907. Serial No. 393,182.

*To all whom it may concern:*

Be it known that I, MARTIN H. OLSON, a citizen of the United States, residing at Leer, in the county of Alpena and State of Michigan, have invented new and useful Improvements in Traps, of which the following is a specification.

This invention relates to game traps, being particularly designed to provide a simple construction of trap for catching birds and animals.

The object of the invention is the production of a trap which may be supported by driving it into the ground or driving it into or otherwise fastening it to a log or other object, and which is adapted to be manufactured at a comparatively low cost.

A further object of the invention is to provide a trap having opposing spring jaws controlled by a novel construction of latch mechanism which, upon release, will allow the jaws to quickly spring to position to clamp the bird or animal between them.

The invention consists of the features of construction, combination and arrangement of parts hereinafter fully described and claimed, reference being had to the accompanying drawing, in which:—

Figure 1 is a perspective view of a trap embodying the invention, shown set for use. Fig. 2 is a front view showing the jaws released and projected. Fig. 3 is an end elevation of the trap with parts arranged as in Fig. 2.

Referring to the drawing, 1 designates a plate forming the supporting frame of the trap, which plate is provided with a tapered or reduced lower end 2 beveled at its lower end to an edge 3 to allow it to be driven into a log or other object. The plate is notched to provide a shoulder 4 which may be struck by a hammer or other tool to drive the anchoring end of the plate into the object. In lieu of attaching the plate in the manner described to an object, it may be driven into the ground, or it may be provided with openings 5 for the passage of screws or other suitable fastening devices to secure it to any suitable support.

The plate is designed to stand vertically and carries at its upper end a U-shaped saddle or bracket 6. This, like the plate, is formed of sheet-metal of a desired thickness and is bent into form so that it will closely straddle the upper edge of the plate. The said saddle or bracket is suitably secured in position, and each of its wings or depending side portions is provided with a pair of ears 7 extending outwardly therefrom at right angles thereto and in parallel relation to each other. The pairs of ears are pierced for the reception of the ends of rods 8, which rods extend parallel with the saddle and frame-plate and are disposed on opposite sides thereof as shown.

Upon each rod is pivotally mounted a substantially U-shaped clamping jaw 9, which jaw is adapted to be projected by a coiled spring 10 surrounding the rod, said spring having one of its ends 11 arranged to bear against the plate 1 and its other end 12 arranged to bear against or engage one of the arms of the jaw, so that when the jaw is swung downward to the position shown in Fig. 1 the spring will be placed under tension and, upon the release of the jaw, will project the same upwardly to a substantially vertical position. The springs may be of any desired strength and when projected upwardly in the manner described are designed to clamp or hold the enticed bird or animal between them. A latch device is provided to hold both jaws retracted against the resistance of the spring, and preferably comprises a lever 13 pivoted at its lower end to the plate 1, as at 14, and having an upper free locking end 15. Intermediate its ends the lever is bent to form a forked portion providing engaging arms or catches 16 adapted when the lever is swung to a vertical position to engage and hold the jaws from swinging movement, as illustrated in Fig. 1.

The plate 1 is provided at the side on which the lever is mounted with a supporting arm 17 extending upwardly therefrom above the plane of the bracket or saddle 6, and upon this arm is pivotally mounted a trip device or lever 18. The lever is pivoted adjacent its outer end upon said arm to provide short arms 19 and 20, the former being provided with a lateral keeper lug or projection 21 apertured to receive the locking end 15 of the locking lever, by which the latter may be held in locking position. The longer arm 20 adapts the lever 18 to normally drop by gravity to the position shown in Fig. 2, so that the locking lever 13 may be conveniently manipulated to bring the keeper 21 into locking engagement with the lever 13. The arm 20 has a sleeve or covering 22 of wood or other suitable material, and is adapted to form a support for the bait, which may be applied thereto in any preferred manner, and a perch on which a bird enticed by the bait may alight.

The mode in which the trap is set for use will be readily understood from the foregoing description, and it will be apparent that when weight or pressure is brought to bear on the arm 20 by an animal seeking the bait or a bird alighting upon the perch, the releasing lever will be swung downward, thus withdrawing the keeper 21 from engagement with the lever 13, which will thereupon swing outward by gravity and release the jaws, which will be projected by their springs to capture the bird or animal.

The structure described adapts the trap to be inexpensively manufactured, and provides a portable trap of light weight which may be conveniently carried and secured to various objects in position for use. The construction of the trap further adapts it for entrapping both birds and animals.

Having thus fully described the invention, what is claimed as new is:—

1. A trap comprising a vertically disposed supporting plate, spring jaws pivotally mounted upon the opposite sides of the plate to swing to clamping position above the plate, a detent lever pivotally mounted for movement toward and from one of the side edges of the plate and having a forked portion to engage the retracted jaws, and a pivoted trip device at the upper end of the plate having a portion to engage with and hold the detent lever in operative position.

2. A trap comprising a vertically disposed supporting plate, spring-actuated companion jaws pivotally mounted on opposite sides of the plate below the top of the plate and adapted to swing to clamping position above the plate, a detent normally out of engagement with the jaws and movable toward and from the same, said detent having portions to project on opposite sides of the plate and positively engage and hold both jaws retracted, and a trip for holding and releasing said detent.

3. A trap comprising a vertically disposed supporting plate, spring jaws pivotally mounted at opposite sides of the plate to swing to a clamping position above the plate, a trip lever pivotally mounted upon one of the upper corner portions of the plate to provide an inwardly extending trip arm and an outwardly extending engaging member, and a detent pivoted at its lower end to the plate and having its upper end arranged to interlock with said engaging member, said detent being provided with a forked portion to engage and hold the jaws retracted.

4. A trap comprising a vertically disposed frame support, spring jaws pivotally mounted upon opposite sides of said support to swing to clamping position above the same, a detent lever having a forked portion providing arms to engage and hold the respective jaws retracted, and a retractable trip to engage and hold said detent in operative position.

5. A trap comprising a vertically disposed frame plate, and trap mechanism carried thereby, said plate being provided with a reduced lower end beveled to a penetrating edge and notched in one of its side edges to form a striking shoulder above the same.

6. A trap comprising a supporting plate, a saddle engaging the upper edge of the plate and having supporting portions projecting on opposite sides thereof, spring-actuated companion jaws pivotally mounted upon the saddle to swing to clamping position above the plate, a device for holding both jaws retracted, and a trip for holding and releasing said device.

In testimony whereof I affix my signature in presence of two witnesses.

MARTIN H. OLSON.

Witnesses:
 OLAF ALFSEN,
 CARL ALFSEN.